(12) United States Patent
Kosugi

(10) Patent No.: US 11,331,617 B2
(45) Date of Patent: May 17, 2022

(54) CANISTER

(71) Applicant: AISAN KOGYO KABUSHIKI KAISHA, Obu (JP)

(72) Inventor: Ryuji Kosugi, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 16/930,395

(22) Filed: Jul. 16, 2020

(65) Prior Publication Data

US 2021/0016219 A1    Jan. 21, 2021

(30) Foreign Application Priority Data

Jul. 19, 2019   (JP) .............................. JP2019-133539

(51) Int. Cl.
*F02M 33/02*    (2006.01)
*B01D 53/04*    (2006.01)
*F02M 25/08*    (2006.01)

(52) U.S. Cl.
CPC .... *B01D 53/0415* (2013.01); *B01D 2253/102* (2013.01); *B01D 2257/702* (2013.01); *B01D 2259/4516* (2013.01); *F02M 25/0854* (2013.01)

(58) Field of Classification Search
CPC .............. F02M 25/08; F02M 25/0836; F02M 25/0854; F02D 41/003; F02D 41/0032; F02D 41/0042
USPC .................................................. 123/516–520
See application file for complete search history.

(56) References Cited

U.S. PATENT DOCUMENTS

| | | | | |
|---|---|---|---|---|
| 4,403,587 A * | 9/1983 | Mizuno | .............. | F02M 25/0854 123/519 |
| 7,997,254 B2 | 8/2011 | Defilippi | | |
| 8,545,610 B2 * | 10/2013 | Makino | .............. | B01D 53/0438 96/134 |
| 9,005,352 B2 * | 4/2015 | Mani | .................. | F02M 25/0854 96/126 |
| 2002/0026874 A1 * | 3/2002 | Ikuma | ................ | F02M 25/0854 96/144 |
| 2005/0109327 A1 * | 5/2005 | Reddy | ................ | F02M 25/0836 123/519 |

(Continued)

FOREIGN PATENT DOCUMENTS

| JP | H09112356 A | 4/1997 |
|---|---|---|
| JP | 2008528854 A | 7/2008 |
| JP | 4589422 B2 | 12/2010 |

*Primary Examiner* — John Kwon
(74) *Attorney, Agent, or Firm* — Conley Rose, P.C.

(57) ABSTRACT

A canister includes a main casing, a first port formed in a wall of the main casing, and a first adsorbent section within the main casing. The first adsorbent section and the wall of the main casing define a space section therebetween. The first adsorbent section includes a first adsorbent and a first retainer holding the first adsorbent. The canister also includes a first elastic element disposed in the space section. The first elastic element urges the first retainer to elastically hold the first adsorbent. In addition, the canister includes a subcasing integral to the wall of the main casing. The subcasing is positioned within the space section. Further, the canister includes a second adsorbent section in communication with the first port. The second adsorbent section includes a second adsorbent disposed within the subcasing. Still further, the canister includes a second retainer holding the second adsorbent.

5 Claims, 4 Drawing Sheets

(56) References Cited

U.S. PATENT DOCUMENTS

| | | | |
|---|---|---|---|
| 2012/0234301 A1* | 9/2012 | Takamatsu | F02M 25/0854 123/519 |
| 2013/0037006 A1* | 2/2013 | Kosugi | B01D 53/0415 123/520 |
| 2015/0007799 A1* | 1/2015 | Takeshita | B01D 53/0407 123/519 |
| 2016/0076490 A1* | 3/2016 | Makino | F02M 25/08 123/519 |

* cited by examiner

CANISTER

CROSS-REFERENCE TO RELATED APPLICATIONS

This application claims benefit of Japanese Patent Application Serial No. 2019-133539, filed Jul. 19, 2019, which is hereby incorporated herein by reference in its entirety for all purposes.

BACKGROUND

The present disclosure relates generally to canisters for collecting fuel vapor.

An automobile or other vehicle equipped with a gasoline engine typically includes a canister containing adsorbent for adsorbing and desorbing evaporated fuel generated in the fuel tank. The adsorbent used may be a granular material such as granular activated carbon. Japanese Patent Application Publication No. H09-112356 (JPH09-112356A) discloses a canister containing adsorbent granules that are elastically held in place by a coil spring, with a filter and a perforated plate positioned between the spring and the granules.

SUMMARY

It is known that breakthrough emission of evaporated fuel remaining in the adsorbent into the atmosphere when the vehicle is stopped can be reduced by increasing the length-to-diameter ratio (L/D ratio) of the adsorbent chamber containing the adsorbent, where L is the length of the volume of adsorbent chamber containing the adsorbent as measured in the direction of fuel vapor flow and D is the effective diameter of the adsorbent chamber containing adsorbent, which may be defined as the diameter of a circle with an area equal to the cross-sectional area of the adsorbent chamber taken in a plane oriented perpendicular to the flow direction.

The canister disclosed in JPH09-112356A requires a larger vertical dimension to accommodate the elastic member (e.g., the coil spring). However, this extra space does not contribute to an increase in the L/D ratio. In other words, the space for the elastic member is not effectively utilized. Thus, there is a need to make more efficient use of the space for accommodating the elastic member to reduce breakthrough emission of fuel vapor.

The present disclosure provides, in an aspect, a canister comprising a main casing, a first port formed in a wall of the main casing, and a first adsorbent section within the main casing. The first adsorbent section and the wall of the main casing defining a space therebetween. The first adsorbent section comprises a first adsorbent and a first retainer holding the first adsorbent. In addition, the canister comprises a first elastic element disposed in the space section. The first elastic element elastically biases and urges the first retainer to elastically hold the first adsorbent. The canister also comprises a subcasing integral to the wall of the main casing. The subcasing is positioned within the space section. In addition, the canister comprises a second adsorbent section in fluid communication with the first port. The second adsorbent section comprises a second adsorbent and a second retainer holding the second adsorbent. The arrangement of the second adsorbent section in the space section is configured to reduce fuel vapor breakthrough while minimizing the increase in the size of the canister.

In some embodiments, the main casing comprises a main casing body having a top opening and a bottom, and a closure closing the top opening of the main casing body and defining a wall of the main casing. The bottom may comprise a second port. In addition, the subcasing has an open end and comprises an air-permeable cover covering the open end of the subcasing. A second elastic element or the second retainer elastically holds the second adsorbent. Since the second adsorbent section can be arranged between the closure and the first adsorbent section, the canister can be assembled more easily.

In some embodiments, the first elastic element comprises a coil spring, the second adsorbent section being disposed within the coil spring. This allows effective reduction of vapor breakthrough while effectively utilizing the space section that accommodates the coil spring.

In some embodiments, the first port comprises an atmospheric port. In this arrangement, the second adsorbent section is in fluid communication with the atmospheric port and has a smaller volume than the first adsorbent. Therefore, a larger amount of purge air per volume of the adsorbent flows through the second adsorbent section than through the first adsorbent section. That is, when the second adsorbent section is in fluid communication with the atmospheric port, the amount of fuel vapor desorbed from the same volume of the adsorbent is larger in the second adsorbent section than in the first adsorbent section. This leads to a more effective prevention of vapor breakthrough.

In some embodiments, the cover is attached to the subcasing via a snap-fit coupling. This allows for providing second adsorbent section in a simple step.

In some embodiments, the cover is attached to the subcasing by welding. This allows for reducing the number of parts required for the second adsorbent section.

Other objects, features, and advantages, of the present disclosure will be readily understood after reading the following detailed description together with the accompanying drawings and the claims.

DETAILED DESCRIPTION

Embodiments will be described below with reference to the drawings.

Figure 1:
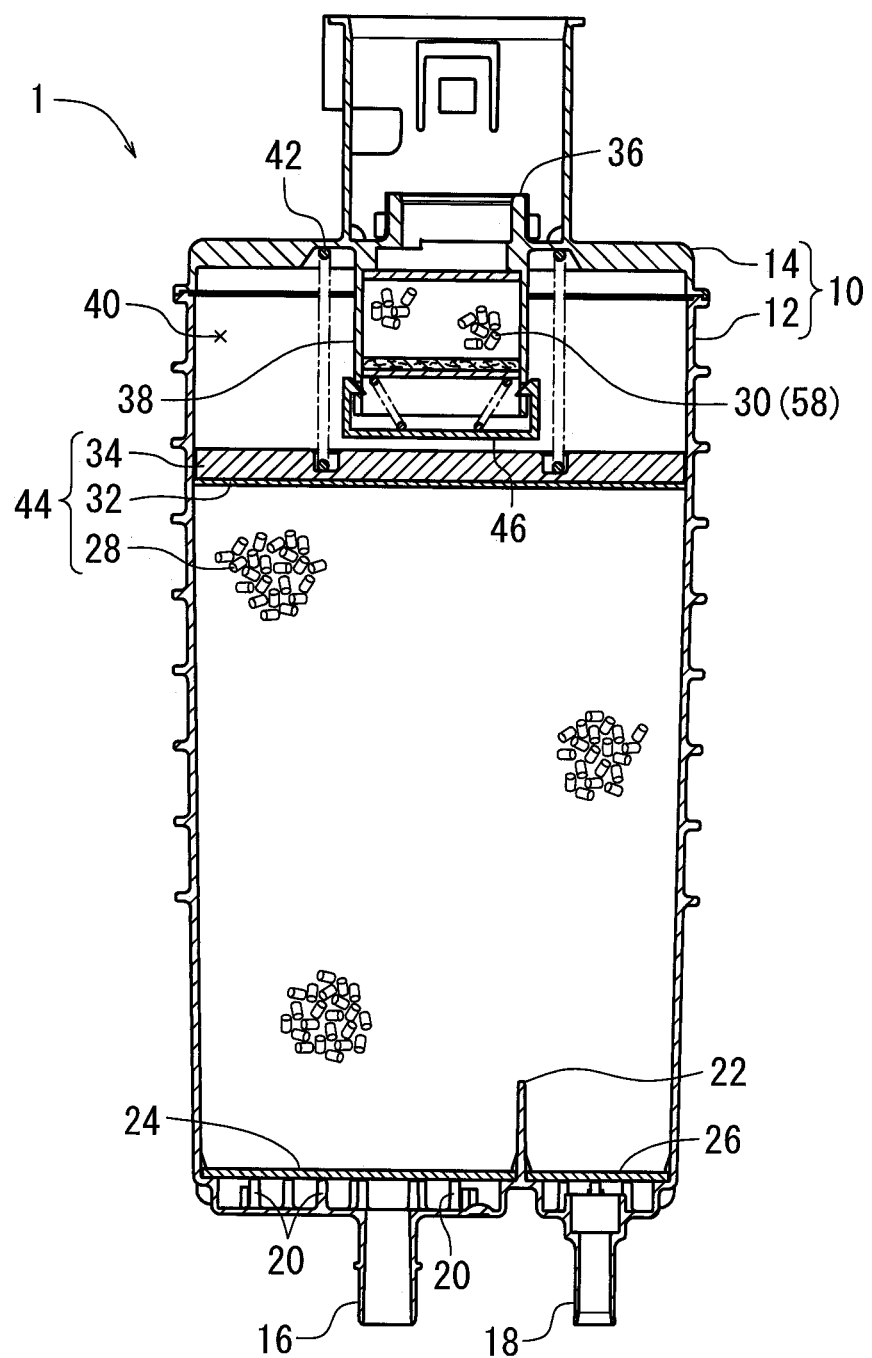
FIG. 1 is a cross-sectional side view of a canister according to an embodiment.

Referring to FIG. 1, an automobile or other vehicle with an internal combustion engine (e.g. gasoline engine) may be provided with a canister 1 for collecting evaporated fuel. For convenience, the directional terms upper (or up), lower (or down), left, and right as used herein to describe the canister are based on the view of FIG. 1. The near and far sides of the sheet of the drawing corresponds to the front and back sides of the canister. Note that these directions do not always match the orientation and/or directions when the canister is mounted on the vehicle.

The canister 1 includes a main casing 10, which is typically made of plastic. The main casing 10 includes a lower cylindrical main casing body 12 and a main casing closure 14 coupled to the main casing body 12. The main casing closure 14 closes an open top of the main casing body 12. The bottom of the main casing body 12 includes a tank port 16 in fluid communication with the fuel tank and a purge port 18 in fluid communication with the intake line or manifold that leads to the internal combustion engine. In this embodiment, a plurality of bosses or posts 20 extend from the upper surface of the bottom of the main casing body 12. A partial partition wall 22 extends upward from the upper surface of the bottom of the main casing body 12 and divides the lower part of the interior of the main casing 10 into two areas. The tank port 16 and the purge port 18 may each also be referred to as the second port herein.

Air-permeable nonwoven fabric sheets 24, 26 are placed on the upper ends of the posts 20, and the adsorbent, which may be activated carbon granules, are disposed on the nonwoven fabric sheets 24, 26. The adsorbent may be filled up to about ¾ the vertical dimension (top to bottom) of the main casing body 12. This volume of adsorbent may also be referred to herein as the first adsorbent 28 so as to be distinguished from the second adsorbent 30 disposed in the subcasing 38 described in more detail below. The first adsorbent 28 and second adsorbent 30 may be in a granular or pelletized form, such as activated carbon granules. The granules of the first and second adsorbent may have the same size and/or the same adsorptivity, or may have different sizes and/or adsorptivities. An air-permeable polyurethane foam sheet 32 and/or a perforated plastic plate 34 may be placed on top of the first adsorbent 28.

The main casing closure 14 includes an atmospheric port 36 in fluid communication with the external atmosphere. A cylindrical inner casing or subcasing 38 extends downward from the lower side of the main casing closure 14. The subcasing 38 may be integrally formed with the main casing closure 14. As will be described in more detail below, the subcasing 38 contains a second adsorbent 30. The main casing closure 14 and the perforated plate 34 define a space section 40 therebetween. A compressed coil spring 42 or any other suitable elastic element is disposed between the main casing closure 14 and the perforated plate 34. Thus, the coil spring 42 is positioned in the space section 40. The coil spring 42 is horizontally oriented with its lower end fitted in a groove defined in the perforated plate 34. The coil spring 42 elastically holds the first adsorbent 28 in position by pressing downward with the perforated plate 34 and polyurethane foam sheet 32 positioned between the coil spring 42 and the first adsorbent 28. This may reduce looseness of the first adsorbent 28. The subcasing 38 may be located within the diameter of the coil spring 42. The first adsorbent 28, the polyurethane foam sheet 32, and the perforated plate 34 define the first adsorbent section 44. The polyurethane foam sheet 32 and perforated plate 34 can be replaced with one or more other retainers of any suitable form.

Figure 2:
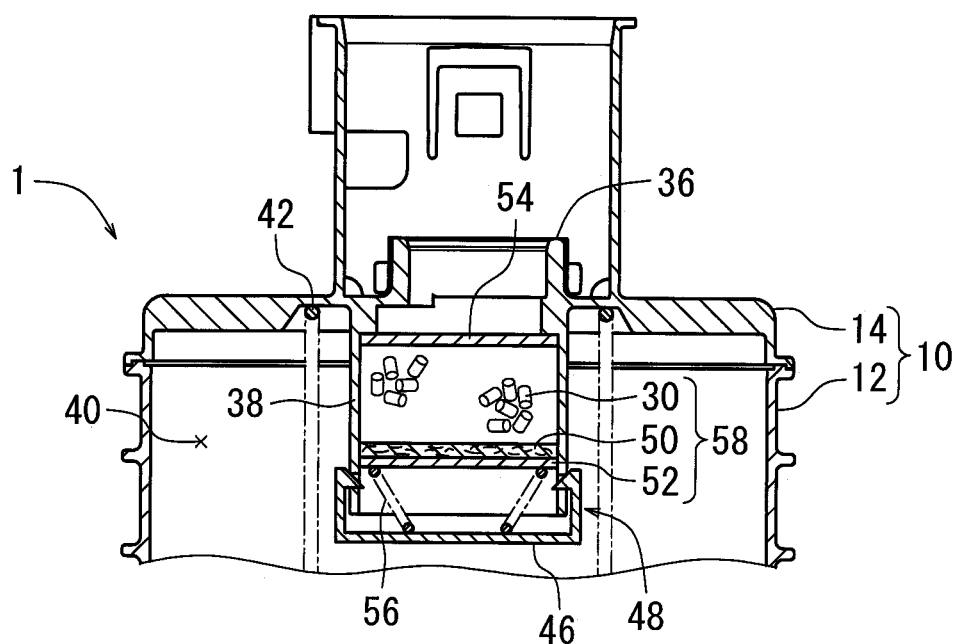
FIG. 2 is an enlarged cross-sectional side view of the main part of the canister shown in FIG. 1.

Referring to FIG. 2, the open lower end of the subcasing 38 is closed by a bottom cylindrical cover 46. The cover 46 may be made of plastic, with the bottom being porous. The subcasing 38 may include holes (two in the shown embodiment) in the lower portion. Further, the side wall of the cover 46 may include, at the upper end, as many claws as there are holes, with the claws being elastically deformable radially outward. The claws are engaged with the holes to form a snap-fit coupling 48 by which the cover 46 is joined to the subcasing 38. The space defined by the subcasing 38 and the cover 46 contains the second adsorbent 30, which is supported from below by an air-permeable polyurethane foam sheet 50 and the plastic perforated plate 52. A filter 54 made of nonwoven fabric is positioned between the atmospheric port 36 and the second adsorbent 30. A compressed coil spring 56 is disposed between the perforated plate 52 and the cover 46, and elastically holds the perforated plate 52 by an upward biasing force. The second adsorbent 30, the polyurethane foam sheet 50, and the perforated plate 52 define the second adsorbent section 58. The polyurethane foam sheet 50 and the perforated plate 52 can be replaced with one or more other retainers of any suitable form.

Referring back to FIG. 1, the cross-sectional area of the first adsorbent 28 in a horizontal plane is larger than the cross-sectional area of the second adsorbent 30 in a horizontal plane. When the diameter of a circle with an area equal to the cross-sectional area perpendicular to the direction of fuel vapor flow is denoted by D, the value of D for the second adsorbent 30 is smaller than that for the first adsorbent 28.

The main casing 10 configured as above defines a linear fluid passage (also known as I-flow type) inside. Fuel vapor evaporated in the fuel tank of the vehicle equipped with the canister 1 flows into the main casing 10 through the tank port 16 and passes through the nonwoven fabric 26. Then, fuel vapor is adsorbed by the first adsorbent 28. The fuel vapor that was not adsorbed by the first adsorbent 28 passes through the polyurethane foam sheet 32 and the perforated plate 34, and flows into the space section 40. The fuel vapor then passes through the cover 46, the perforated plate 52, and the polyurethane foam sheet 50 (see FIG. 2), and is adsorbed by the second adsorbent 30. The air containing little to no fuel vapor then passes through the filter 54 and is discharged from the atmospheric port 36 to the atmosphere. On the other hand, when the vehicle is traveling and thus the engine is operating, outside air (purge air) is drawn through the atmospheric port 36 into the main casing 10 and flows through the fluid passage in the opposite direction toward the purge port 18. During this, the adsorbed fuel vapor in the second adsorbent 30 and first adsorbent 28 is desorbed by the purge air. Then, the air containing the fuel vapor flows out of the purge port 18 and into the intake line.

To assemble the canister, the main casing closure 14 is held upside down with respect to the position shown in FIG. 2. The filter 54 is then placed in the subcasing 38. The second adsorbent 30 is placed on the filter 54, and then the polyurethane foam sheet 50 and the perforated plate 52 are placed in order on top of the second adsorbent 30. Next, the coil spring 56 is placed on the perforated plate 52, and then the cover 46 is fitted to the subcasing 38 to close the opening. After aligning the positions of the holes formed in the subcasing 38 and the claws formed in the cover 46, the cover 46 is pushed down toward the subcasing 38 and against the elastic force of the coil spring 56 until the snap-fit coupling 48 is established. After these steps, the second adsorbent section 58 is attached to the main casing closure 14.

Next, the nonwoven fabric sheets 24, 26 are placed on the posts 20 protruding from the bottom of the main casing body 12 shown in FIG. 1, and the first adsorbent 28 is placed on the nonwoven fabric sheets 24, 26. Then, the polyurethane sheet 32 and the perforated plate 34 are placed on top of the first adsorbent 28. The coil spring 42 is then fitted at one end in the groove formed in the perforated plate 34. The main casing closure 14 with the second adsorbent section 58 attached is moved toward the main casing body 12, while the subcasing 38 and cover 46 are positioned to be inserted within the diameter of the coil spring 42, against the elastic force of the coil spring 42 until the main casing closure 14 is fitted to the main casing body 12. Finally, the main casing body 12 and closure 14 are joined by welding. Through these steps, the assembly of the canister 1 is complete.

When granular materials such as granular activated carbon are used as the adsorbent, the granules need to be prevented from being crushed due to rattling as the vehicle travels by using a coil spring to hold the granules in place through a filter, polyurethane foam sheet, and perforated plate that are appropriately selected. On the other hand, in order to reduce breakthrough emission of fuel vapor adsorbed by the adsorbent to the atmosphere when the vehicle is stopped, it is effective to increase the L/D ratio, where L is the length in the adsorbent chamber as measured in the flow direction of the evaporated fuel, and D is the diameter of a circle having an area equal to the cross-sectional area of the adsorbent chamber in a plane oriented perpendicular to the flow direction.

As described above, the second adsorbent section 58 is covered with the subcasing 38 and extends from the main casing closure 14. The first adsorbent section 44 is arranged with a space section 40 between it and the closure 14 of the main casing 10. The coil spring 42 that elastically holds the first adsorbent section 44 is disposed in the space section 40. The second adsorbent section 58 is disposed in the space section 40, and more specifically, within the diameter of the coil spring 42. This configuration allows effective use of the space section 40 for accommodating the coil spring 42 to increase the L/D ratio. This means that breakthrough emission of fuel vapor can be reduced while minimizing the increase in the size of the canister 1.

Most of the fuel vapor from the tank port 16 is adsorbed by the first adsorbent 28 in the first adsorbent section 44. Therefore, the second adsorbent section 58, which is in fluid communication with the atmospheric port 36, can have a larger value of the L/D ratio to prevent vapor breakthrough than to contain a larger amount of adsorbent. Therefore, the second adsorbent section 58 configured as described above and in communication with the atmospheric port 36 can effectively reduce breakthrough emission.

The cover 46 is attached to the subcasing 38 by a snap-fit coupling 48. This allows the second adsorbent section 58 to be installed in a simpler manner.

Figure 3:
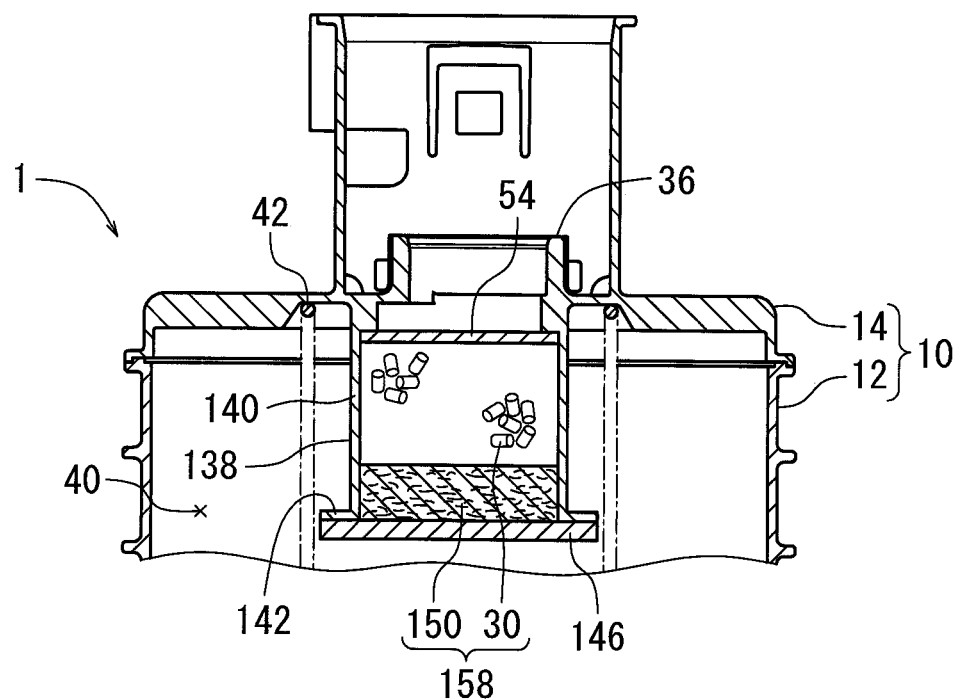
FIG. 3 is an enlarged cross-sectional side view of the main part of a canister according to another embodiment.

Referring now to FIG. 3, in other embodiments, the structure of the second adsorbent section is altered. The features that are not described or shown may be the same as the embodiments described above and will be given the same reference numerals.

In the embodiment shown in FIG. 3, the subcasing 138 has a tubular portion 140 extending from the lower side of the main casing closure 14 and a flange 142 extending radially outward from the lower end of the tubular portion 140. The lower end opening of the subcasing 138 is closed by a cover 146 such as a plastic perforated plate. The second adsorbent 30 is accommodated in the space defined by the subcasing 138 and the cover 146 while being urged and pressed from below by the air-permeable polyurethane foam sheet 150. A filter 54 made of a nonwoven fabric is positioned between the atmospheric port 36 and the second adsorbent 30. The polyurethane foam sheet 150 may have a larger thickness than the polyurethane foam sheet 50 of the embodiment described above. The polyurethane foam sheet 150 is accommodated in a space defined by the subcasing 138 and the cover 146 in a compressed state. The second adsorbent 30 and the polyurethane foam sheet 150 form the second adsorbent section 158. The polyurethane foam sheet 150 can be replaced with another retainer of any suitable form.

Only the assembling of the second adsorbent section to the main casing closure will be described. The main casing closure 14 is held upside down with respect to the position shown in FIG. 3. The filter 54 is then placed in the tubular portion 140 of the subcasing 138. Next, the second adsorbent 30 is placed on the filter 54, and the polyurethane foam sheet 150 is placed on top of the second adsorbent 30. The cover 146 is then placed on the polyurethane foam sheet 150 and pushed down, compressing the polyurethane foam sheet 150, until it comes into contact with the flange 142. The flange 142 and the cover 146 are then joined by welding.

The second adsorbent section 158 disposed in the space section 40, and more specifically, within the diameter of the coil spring 42, allows for the effective use of the space section 40 that accommodates the coil spring 42 to increase the L/D ratio. This means that breakthrough emission of fuel vapor is effectively reduced while minimizing the increase in the size of the canister 1.

The second adsorbent section 158 in communication with the atmospheric port 36 allows an effective reduction of breakthrough emission while maintaining the adsorption capacity of the canister 1.

The cover 146 is attached to the subcasing 138 by welding. This reduces the number of parts required for constructing the second adsorbent section 158.

Figure 4:
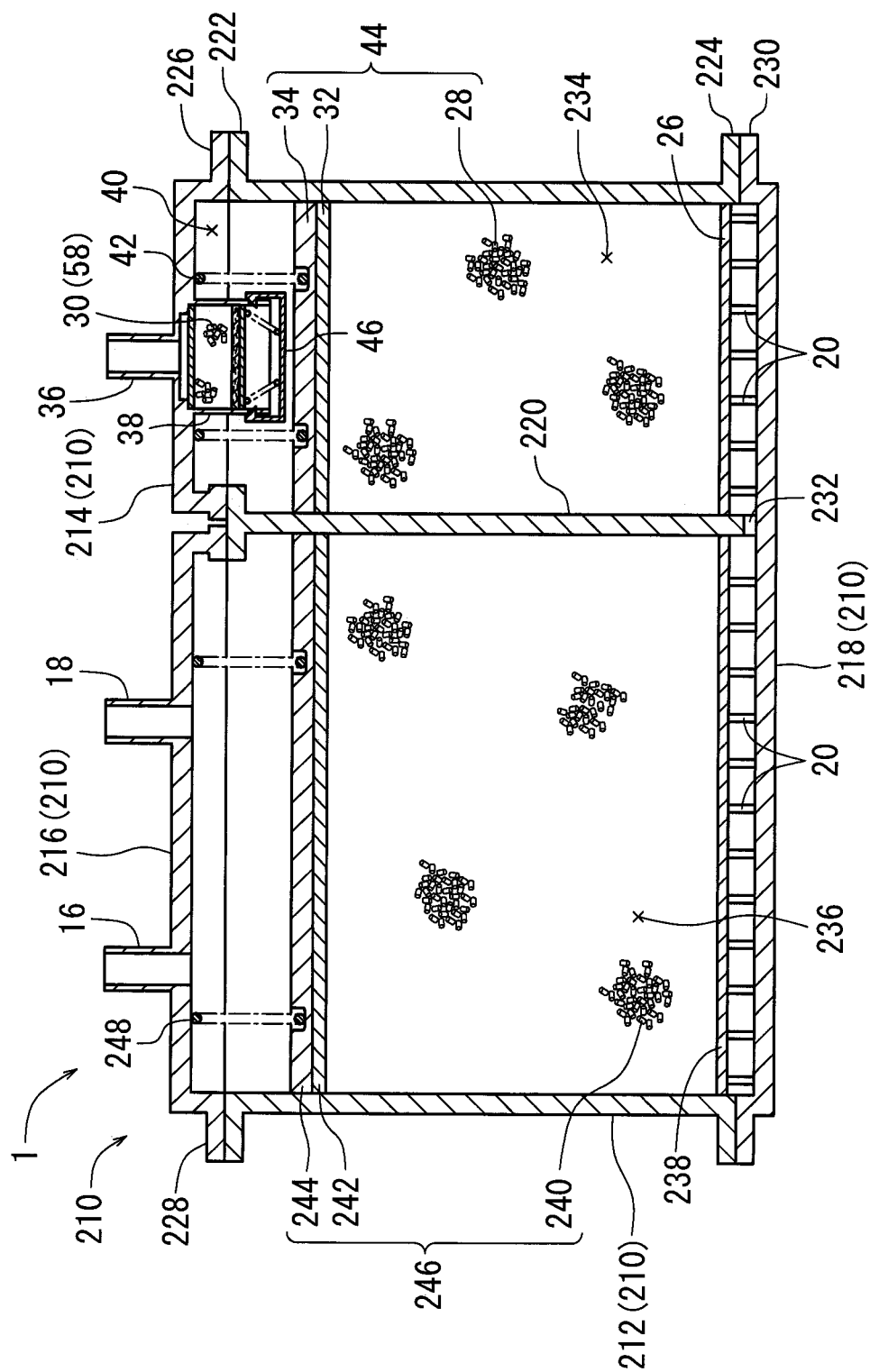
FIG. 4 is a cross-sectional side view of a canister according to yet another embodiment.

Referring now to FIG. 4, in another embodiment, a U-flow type canister can have similar features to those described above. The features that are not described below or shown may be the same as the embodiments described above and will be given the same reference numerals. For convenience, the directional terms upper (or up), lower (or down), left and right as used herein to describe the canister are based on the view of FIG. 4. The near and far sides of the sheet of the drawing corresponds to the front and back sides of the canister. Note that these directions do not always match the orientation and/or directions when the canister is mounted on the vehicle.

The main casing 210 of the canister 1 may include a substantially tubular main casing body 212, a first main casing closure 214, a second main casing closure 216, and a main casing bottom 218. The first main casing closure 214 and the second main casing closure 216 close the upper openings of the main casing body 212. The main casing bottom 218 closes the lower opening of the main casing body 212. The interior of the main casing body 212 is divided into two chambers by the partition wall 220. The first main casing closure 214 includes the atmospheric port 36, and the second main casing closure 216 includes the tank port 16 and the purge port 18. In this embodiment, a plurality of posts 20 extend upward from the main casing bottom 218.

The tubular main casing body 212 includes flanges 222, 224 on the upper and lower ends, respectively. The partition wall 220 includes a flange on the upper end. The upper flange 222 is joined by welding to part of the flange 226 of the first main casing closure 214 (other than the portion joined to the flange of the partition wall 220 described later) and part of the flange 228 of the second main casing closure 216 (other than the portion joined to the flange of the partition wall 220). The lower flange 224 is joined to the flange 230 of the main casing bottom 218 by welding. The flange of the partition wall 220 is joined by welding to the portion of the flange 226 of the first closure 214 that is not joined to the flange 222 of the main casing body 212 and the portion of the flange 228 of the second closure 216 that is not joined to the flange 222 of the main casing body 212.

The main casing 210 configured as described above defines two adsorbent chambers 234, 236 therein. The partition wall 220 includes a communication hole 232 at the lower end that provides fluid communication between the two adsorbent chambers 234, 236.

The adsorbent chamber 234 that communicates to the atmospheric port 36 includes a first adsorbent section 44 having a first adsorbent 28 disposed therein and a second adsorbent section 58 having a second adsorbent 30 disposed therein. The second adsorbent section 58 is disposed within the diameter of the coil spring 42, which elastically holds the first adsorbent section 44 by downward pressure.

The adsorbent chamber 236 in fluid communication with the tank port 16 and purge port 18 includes an air-permeable polyurethane foam sheet 238 placed on the posts 20 and a third adsorbent 240 disposed on the upper side of the polyurethane foam sheet 238. The third adsorbent 240 may have the same size and/or adsorptivity as at least one of the first adsorbent 28 and the second adsorbent 30, or may have a different size and/or adsorptivity. A filter 242 made of a nonwoven fabric and a plastic perforated plate 244 are placed on the third adsorbent 240. The third adsorbent 240, the filter 242, and the perforated plate 244 constitute the third adsorbent section 246. The third adsorbent section 246 is elastically held by the coil spring 248 with downward pressure.

Assembly of the canister 1 configured as above will now be described. The second adsorbent section 58 can be assembled to the first main casing closure 214 in substantially the same way as that of the embodiments described above, and therefore the description thereof will be omitted. First, the flange 224 of the main casing body 212 and the flange 230 of the main casing bottom 218 are fitted together and joined by welding. The main casing body 212 and the main casing bottom 218 defines two chambers. In the chamber on the right side of the partition wall 220, the nonwoven fabric 26 is placed on the posts 20, and the first adsorbent 28 is placed on the nonwoven fabric 26. The polyurethane foam sheet 32 and the perforated plate 34 are then placed on top of the first adsorbent 28. In the chamber on the left side of the partition wall 220, the polyurethane foam sheet 238 is placed on the posts 20, and the third adsorbent 240 is placed on the the polyurethane foam sheet 238. The filter 242 and the perforated plate 244 are then placed on top of the third adsorbent 240.

The coil spring 42 is then fitted at one end to the groove in the perforated plate 34. The upper right opening of the main casing body 212 is closed with the first main casing closure 214 to which the second adsorbent section 58 has already been assembled. More specifically, the flange 226 is horizontally aligned with respect to the corresponding portions of the flange 222 on the outer wall and the flange on the partition wall 220 and is joined thereto by welding. Similarly, the coil spring 248 is fitted at one end to the groove in the perforated plate 244. The upper left opening of the main casing body 212 is closed with the second main casing closure 216. More specifically, the flange 228 is horizontally aligned with respect to the corresponding portions of the flange 222 on the outer wall and the flange on the partition wall 220 and is joined thereto by welding.

Since the second adsorbent section 58 is disposed in the space section 40, more specifically, within the diameter of the coil spring 42, the space section 40 for disposing the coil spring 42 can be effectively used, and the L/D ratio can be increased. This means that breakthrough emission can be effectively reduced while minimizing the increase in the size of the canister 1.

The second adsorbent section 58 in fluid communication with the atmospheric port 36 allows an effective reduction of breakthrough emission while maintaining the adsorption capacity of the canister 1.

Figure 5:
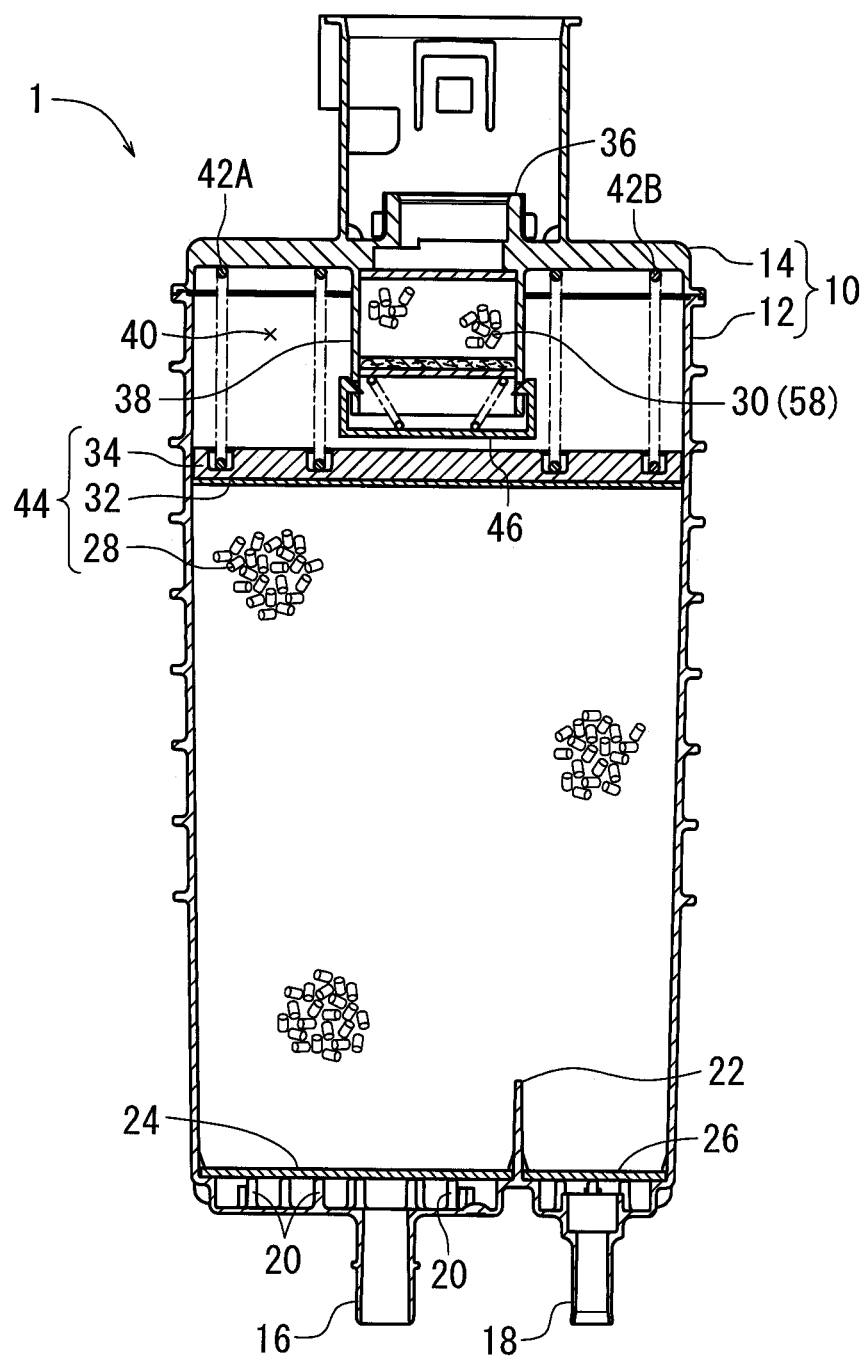
FIG. 5 is a cross-sectional side view of a canister according to a modified embodiment.

Referring now to FIG. 5, in other embodiments, the coil spring 42 described above can be altered in number and/or arrangement. For example, the canister 1 may include two coil springs 42A and 42B arranged in the space section 40. The second adsorbent section 58 is disposed in the space section 40. The (horizontal) cross-sectional area of the first adsorbent 28 is larger than the cross-sectional area of the second adsorbent 30. However, the second adsorbent section 58 is not disposed within the diameter of the coil springs 42A, 42B. This configuration allows effective utilization of the space section 40 that accommodates the coil springs 42A, 42B to increase the L/D ratio. The two coil springs 42A, 42B shown in FIG. 5 are arranged at two locations around the subcasing 38. Alternatively, two coil springs with different diameters may be arranged with the smaller one inside the larger.

The subcasing 38 has been described above as having a cylindrical shape, but, in other embodiments, may have any tubular form other than cylindrical form. Similarly, the tubular portion 140 of the subcasing 138 may have any tubular form. Similarly, the cover 46 that closes the lower end opening of the subcasing 38 may have any tubular shape.

While specific embodiments has been described above, it will be understood by those skilled in the art that various modifications may be made and equivalents may be substituted for elements thereof without departing from the scope of the disclosure.

What is claimed is:

1. A canister comprising:
   a main casing;
   a firs port formed in a wall of the main casing;
   a first adsorbent section within the main casing, wherein the first adsorbent section and the wall of the main casing defining a space section therebetween, and wherein the first adsorbent section comprises:
     a first adsorbent; and
     a first retainer holding the first adsorbent;
   a first elastic element comprising a coil spring and disposed in the space section, wherein the first elastic element biases the first retainer to elastically hold the first adsorbent of the first adsorbent section,
   a subcasing integral with the wall of the main casing, wherein the subcasing is positioned within the space section; and
   a second adsorbent section disposed within the coil spring and in fluid communication with the first port, wherein the second adsorbent section comprises:
     a second adsorbent disposed within the subcasing; and
     a second retainer holding the second adsorbent.

2. The canister according to claim 1, wherein the main casing comprises:
   a main casing body having an open top and a bottom; and
   a closure closing the open top opening of the main casing body, wherein the closure defines the wall of the main casing;
   wherein the bottom of the main casing body includes a second port;

wherein the subcasing has an open end and includes an air-permeable cover covering the open end of the subcasing; and a second elastic element or the second retainer elastically holding the second adsorbent.

3. The canister according to claim 1, wherein the first port is an atmospheric port.

4. The canister according to claim 2, wherein the cover is attached to the subcasing with a snap-fit coupling.

5. The canister according to claim 2, wherein the cover is attached to the subcasing by welding.

* * * * *